United States Patent
Shikata

(10) Patent No.: US 8,245,941 B2
(45) Date of Patent: Aug. 21, 2012

(54) RECORDING METHOD, RECORDER AND IC CARD

(75) Inventor: Kaname Shikata, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1301 days.

(21) Appl. No.: 11/647,798

(22) Filed: Dec. 28, 2006

(65) Prior Publication Data

US 2007/0145157 A1 Jun. 28, 2007

(30) Foreign Application Priority Data

Dec. 28, 2005 (JP) ................................. 2005-379823

(51) Int. Cl.
*G06K 19/06* (2006.01)

(52) U.S. Cl. ........................................ 235/492; 235/380

(58) Field of Classification Search .................. 235/492, 235/379, 380; 713/200, 190, 193
See application file for complete search history.

(56) References Cited

U.S. PATENT DOCUMENTS

| 4,839,506 A | * | 6/1989 | Homma et al. | ............... 235/379 |
| 5,450,366 A | | 9/1995 | Watanabe | |
| 5,563,945 A | * | 10/1996 | Gercekci | ....................... 713/190 |
| 6,519,702 B1 | | 2/2003 | Williams | |
| 6,572,024 B1 | * | 6/2003 | Baldischweiler et al. | ..... 235/492 |
| 7,406,604 B2 | * | 7/2008 | Berry et al. | .................... 713/193 |
| 2002/0124179 A1 | * | 9/2002 | Kaminaga et al. | ............ 713/194 |
| 2003/0061501 A1 | | 3/2003 | Yamada | |
| 2004/0134994 A1 | * | 7/2004 | Zaba et al. | ..................... 235/492 |
| 2005/0001041 A1 | * | 1/2005 | McCarthy et al. | ............ 235/492 |
| 2005/0216762 A1 | * | 9/2005 | Peikari | ........................... 713/200 |
| 2007/0005991 A1 | | 1/2007 | Kober et al. | |

FOREIGN PATENT DOCUMENTS

| CN | 1432155 A | 7/2003 |
| DE | 103 16 951 | 10/2004 |
| FR | 2 787 216 | 6/2000 |
| JP | 61-123935 | 6/1986 |
| JP | 07-065139 | 3/1995 |
| JP | 08-190614 | 7/1996 |
| JP | 11-045212 | 2/1999 |
| JP | 2000-222202 A | 8/2000 |

OTHER PUBLICATIONS

European Search Report dated Jun. 21, 2007, directed to counterpart EP application No. 06256364.8 (3 pages).

* cited by examiner

*Primary Examiner* — Thien T Mai
(74) *Attorney, Agent, or Firm* — Morrison & Foerster LLP

(57) ABSTRACT

In an IC card provided with a recording unit having a plurality of recording areas designated by continuous addresses, a unit for executing a command based on information recorded in the recording unit, and a unit for communicating with an external apparatus, when the information received from the external apparatus is recorded in the recording unit, the information is divided and recorded in the plurality of recording areas designated by discontinuous addresses.

9 Claims, 9 Drawing Sheets

F I G. 2

| ADDRESS | FILE |
|---|---|
| 0x000000 | FILE1 |
| 0x001000 | FILE2 |
| 0x002500 | FILE3 |
| ⋮ | ⋮ |

FIG. 3

| RECORD ADDRESS | ATTRIBUTE INFORMATION | FILE ADDRESS | COMMAND SPECIFYING INFORMATION |
|---|---|---|---|
| P1 | 0x00 | 0x000000 | FILE1 0x00 |
| P2 | 0x00 | 0x001000 | FILE2 0x00 |
| P3 | 0x00 | 0x002500 | FILE3 0x00 |
| P4 | 0xFF | 0xXXXXXX | XXXXXX |
| ⋮ | ⋮ | ⋮ | ⋮ |

F I G. 4

| ADDRESS | RECEIVED INFORMATION |
|---|---|
| 0xffff01 | |
| 0xffff02 | ILLEGAL COMMAND CODE |
| 0xffff03 | |
| 0xffff04 | ILLEGAL COMMAND CODE |
| 0xffff05 | |
| 0xffff06 | ILLEGAL COMMAND CODE |
| 0xffff07 | |
| 0xffff08 | ILLEGAL COMMAND CODE |
| 0xffff09 | |
| 0xffff0a | ILLEGAL COMMAND CODE |
| 0xffff0b | |
| 0xffff0c | ILLEGAL COMMAND CODE |
| ⋮ | ⋮ |

FIG. 6

| COMMAND HEADER | | | | COMMAND BODY | | |
|---|---|---|---|---|---|---|
| CLA | INS | P1 | P2 | Lc FIELD | DATA FIELD | Le FIELD |

F I G. 7

| ADDRESS | RECEIVED INFORMATION |
|---|---|
| 0xffff01 | F |
| 0xffff02 | ILLEGAL COMMAND CODE |
| 0xffff03 | I |
| 0xffff04 | ILLEGAL COMMAND CODE |
| 0xffff05 | L |
| 0xffff06 | ILLEGAL COMMAND CODE |
| 0xffff07 | E |
| 0xffff08 | ILLEGAL COMMAND CODE |
| 0xffff09 | 2 |
| 0xffff0a | ILLEGAL COMMAND CODE |
| 0xffff0b | 0x00 |
| 0xffff0c | ILLEGAL COMMAND CODE |
| ⋮ | ⋮ |

FIG. 9

| PHASE | VARIABLE P | VARIABLE X | VARIABLE Y |
|---|---|---|---|
| 1 | P1 | ? | ? |
| 2 | P1 | 0x00 | 0x00 |
| 3 | P1 | F | F |
| 4 | P1 | I | I |
| 5 | P1 | L | L |
| 6 | P1 | E | E |
| 7 | P1 | 2 | 1 |
| 8 | P2 | 2 | 1 |
| 9 | P2 | F | F |
| 10 | P2 | I | I |
| 11 | P2 | L | L |
| 12 | P2 | E | E |
| 13 | P2 | 2 | 2 |
| 14 | P2 | 0x00 | 0x00 |

RECORDING METHOD, RECORDER AND IC CARD

CROSS-REFERENCE TO RELATED APPLICATIONS

This Nonprovisional application claims priority under 35 U.S.C. §119(a) on Patent Application No. 2005-379823 filed in Japan on Dec. 28, 2005, the entire contents of which are hereby incorporated by reference.

BACKGROUND OF THE INVENTION

1. Field of the Invention

The present invention relates to a recording method recording information in an IC card, a recorder using the recording method, and an IC card using the recording method, and particularly relates to the recording method, the recorder, and the IC card capable of preventing an execution of an illegal program transmitted from an external apparatus.

2. Description of Related Art

An IC card, on which a memory such as a ROM and RAM, and a CPU are loaded, can record a large amount of data compared to a magnetic card, and has a high safety. This contributes to further spreading of the IC card in the future. By making such an IC card communicate with an external apparatus (reader-writer) that performs recording/reading of information with or without making contact therewith, the external apparatus transmits to the IC card the information such as a command APDU (Application Protocol Data Unit) defined by a standard such as an ISO/IEC7816-4, executes a processing based on received information, and transmits its result to the external apparatus as a response.

However, important information including personal information is recorded in the memory loaded on the IC card. Therefore, there is a possibility that by applying an attack to the IC card, illegal reading of stored information, and an illegal action such as alteration are performed.

The illegal action to the IC card will be explained. The information transmitted from the external apparatus to the IC card as the APDU must be originally processed by the IC card. However, it is also possible for an attacker having a malicious intent to transmit not the information to be processed by the IC card but a command (program code) for the illegal action that can be executed by the CPU, as the information to be transmitted as the command APDU, from an external apparatus to the IC card. In the IC card that receives from the external apparatus the command APDU including the command for the illegal action, the received command is recorded in the memory loaded thereon as the RAM for a reception buffer. The CPU loaded on the IC card incorporates a program counter that shows an address of the command to be executed next, and the program counter is changed every time the command is executed. When the attacker performs an attack such as a particular noise irradiation to the IC card by operating the program counter, and the address on the memory used as the reception buffer is set in the program counter, the command recorded in the memory is executed by the CPU, and illegal reading of the information stored in the memory and the illegal action such as alteration are performed.

As a countermeasure to such an illegal action, Japanese Patent Laid Open No. 2000-222202 discloses a technique of preventing the illegal action by converting the command incorporated in the command APDU transmitted from the external apparatus into a non-executable state and recording it in the memory. When the command recorded in the memory is executed, by performing a reverse conversion, an original command is restored and executed.

As described above, a conventional IC card has a problem that the illegal action combining the command APDU and an external attack may be possibly performed.

Also, the technique disclosed in Japanese Patent Laid Open No. 2000-222202 has a problem that a processing load and a processing time associated with the conversion and the reverse conversion are increased. In addition, although the command APDU converted and recorded in the memory is not executed, there is a possibility that the illegal action is performed when the reverse-converted command APDU is executed.

BRIEF SUMMARY OF THE INVENTION

In view of the above-described circumstances, the present invention is provided, and a main object of the present invention is to provide a recording method, a recorder using the recording method, and an IC card using the recording method capable of preventing an illegal action without increasing a processing load and a processing time, by dividing and recording reception information in recording areas designated by discontinuous addresses, when the reception information is received from an external apparatus on a memory having a recording areas to which continuous addresses are assigned.

Further, another object of the present invention is to provide an IC card capable of preventing the illegal action without increasing the processing load and the processing time by not restoring and executing a command from recorded reception information, but retrieving command specifying information that is coincident with the recorded reception information and executing the command specified by the retrieved command specifying information.

According to the recording method of the present invention, in the IC card provided with a recording unit having a plurality of recording areas to which continuous addresses are assigned and a unit for communicating with an external apparatus, when the information received from the external apparatus is recorded in the recording unit, the information is divided and recorded in a plurality of recording areas designated by discontinuous addresses.

The recorder of the present invention comprises:

a recording unit having a plurality of recording areas, to which continuous addresses are assigned;

a communication unit for communicating with an external apparatus; and a unit for dividing and recording reception information received by the communication unit in a plurality of recording areas designated by discontinuous addresses.

The IC card according to the present invention comprises the recording unit having a plurality of recording areas to which the continuous addresses are assigned, the communication unit for communicating with the external apparatus, the unit for dividing and recording the reception information received by the communication unit in the plurality of recording areas designated by the discontinuous addresses, and a command executing unit for executing the command based on the information recorded in the recording areas.

According to the IC card of the present invention, the information non-executable by the command executing unit is recorded in some of the plurality of recording areas, and the reception information is divided and recorded in areas in which the information is not recorded.

According to the IC card of the present invention, the information non-executable by the command executing unit is recorded in some of the plurality of recording areas, and the reception information is divided and recorded in the areas in which the information is not recorded.

According to the IC card of the present invention, the processing is a reset processing or an illegal interrupt processing.

According to the IC card of the present invention, the IC card comprises a unit for recording a command specifying information specifying a previously recorded command, a unit for retrieving the command specifying information that is coincident with the information divided and recorded in the recording areas, and a unit for executing the command specified by the retrieved command specifying information.

According to the IC card of the present invention, the reception information and the command specifying information are retrieved by collating them per every prescribed collation unit.

According to the recording method, the recorder, and the IC card of the present invention, the received reception information is divided and recorded in the recording areas designated by discontinuous addresses, and by recording non-executable information in the recording areas in which the reception information is not recorded, even if an illegal command is written from outside as the reception information, the command executing unit reads the non-executable information when an illegal operation is received, whereby the command executing unit is made to execute the illegal command based on the written reception information, thereby making it possible to prevent the execution of the illegal command written from the outside, because a countermeasure processing to abnormality such as reset processing and illegal interrupt processing is performed when the command executing unit reads the non-executable information.

Also, according to the IC card of the present invention, the reception information and the command specifying information are collated per every prescribed collation unit, and by executing the command specified by the command specifying information that is found to be coincident with the reception information after collation, the command is specified and executed even if not completely restoring the reception information, thus making it possible to prevent an increase of the processing load and the processing time required for restoring the command and prevent the execution of the illegal command, because the command thus executed is a legal command previously recorded.

According to the recording method, the recorder, and the IC card of the present invention, there are provided the recording unit having a plurality of recording areas to which continuous addresses are assigned, the command executing unit for executing the command based on the information recorded in the recording unit, and the communication unit for communicating with the external apparatus, which are applied to the IC card for recording the information received from the external apparatus in the recording unit, wherein the IC card divides and records the reception information received by the communication unit from the external apparatus in a plurality of recording areas designated by discontinuous addresses. Also, the non-executable information that can not be executed by the command executing unit is recorded in the recording areas in which the reception information is not recorded.

By the aforementioned structure, according to the present invention, even if the recorded reception information received from the outside is the illegal command, when the command executing unit reads the non-executable information at the time of receiving the illegal operation, whereby the illegal command based on the recorded reception information is executed by the command executing unit, the command executing unit reads the non-executable information and the countermeasure processing to abnormality such as reset processing and illegal interrupt processing is performed, thus making it possible to exhibit an excellent advantage of preventing the execution of the illegal command written from the outside, illegal reading of the stored information, and the illegal action such as alteration.

In addition, according to the present invention, the legal command is previously recorded, and the command specifying information specifying the recorded legal command is recorded in the command specifying information recording unit. Then, the reception information and the command specifying information are collated per every prescribed collation unit as the executing processing of the command based on the reception information, and the command specified by the command specifying information that is found to be coincident with the reception information after collation is executed.

By this structure, according to the present invention, even if not completely restoring the reception information, the command is specified and executed, thus making it possible to exhibit the excellent advantage of preventing the increase of the processing load and the processing time required for restoring the command. In addition, since the command to be executed is the legal command previously recorded, the excellent advantage is exhibited such as preventing the execution of the illegal command.

The above and further objects and features of the invention will more fully be apparent from the following detailed description with accompanying drawings.

BRIEF DESCRIPTION OF THE SEVERAL VIEWS OF THE DRAWINGS

FIG. 2 is a conceptual view showing an example of a recording content of a file storage area of the IC card of the present invention;

FIG. 3 is a conceptual view showing an example of the recording content of a file management table of the IC card of the present invention;

FIG. 4 is a conceptual view showing an example of the recording content of a reception buffer of the IC card of the present invention;

FIG. 6 is a conceptual view showing an example of a content of reception information received by the IC card of the present invention;

FIG. 7 is a conceptual view showing an example of a state of recording the reception information in the reception buffer of the IC card of the present invention;

FIG. 9 is a table showing an example of a change quantity of values of variables used in the reception information reading processing of the IC card of the present invention.

DETAILED DESCRIPTION OF THE INVENTION

Hereafter, preferred embodiments of the present invention will be described in detail based on the drawings.

Figure 1:
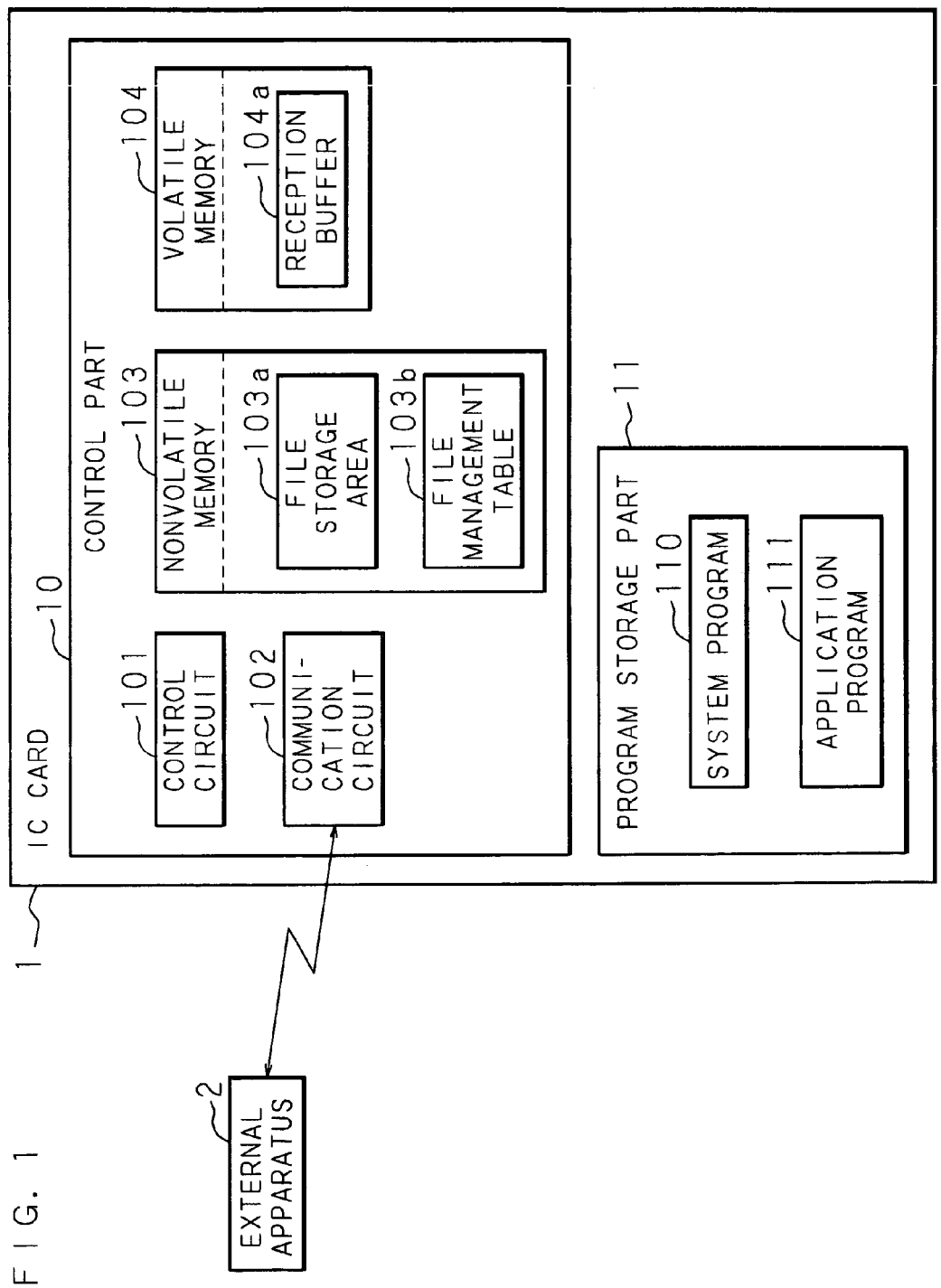
FIG. 1 is a block diagram showing a constitutional example of each kind of device used in a recording method wherein an IC card of the present invention is used.

FIG. 1 is a block diagram showing a constitutional example of each kind of device used in a recording method wherein an IC card of the present invention is used. Designation mark "1" in the figure indicates the IC card, which is a kind of a recorder. The IC card 1 is capable of communicating with an external apparatus 2 such as a reader-writer with or without making contact therewith, and by allowing the IC card 1 to approach the external apparatus 2, the external apparatus 2 transmits information such as a command APDU (Application Protocol Data Unit) defined by a standard such as an ISO/IEC7816-4, and in the IC card 1, processing based on a command shown by received information is executed, and its result is transmitted to the external apparatus 2 as a response. Each kind of command and the information such as personal information are written in the IC card 1, in a manufacturing and issuing process before being issued to a user. In an operation process after the IC card is issued to the user, the processing such as communication with the external apparatus 2 and authentication based on the written information is executed.

The IC card 1 comprises a control part 10 controlling the processing of inside and a program storage part 11 storing a program executed based on a control of the control part 10.

The control part 10 comprises a control circuit 101 such as a CPU (Central Processing Unit) having a function as a command executing unit for executing each kind of command, a communication circuit 102 communicating with the external apparatus 2, a nonvolatile memory 103 recording the information written thereinto in the manufacturing and issuing process of the personal information and each kind of command, etc, and a volatile memory 104 temporarily recording the information in the operation process after issuance.

Some of the recording areas of the nonvolatile memory 103 is used as a file storage area 103a recording a file such as a command executable by the control circuit 101 and a file management table 103b managing a file recorded in the file storage area 103a. Some of the recording areas of the volatile memory 104 is used as a reception buffer 104a temporarily recording the information received from the external apparatus 2.

The program storage part 11 stores a system program 110 being the program related to a system such as a record of the received information, and an application program 111 being the program related to the command recorded in the file storage area 103a as a file.

FIG. 2 is a conceptual view showing an example of the recording content of the file storage area 103a of the IC card 1 of the present invention. The file storage area 103a has a plurality or areas for storing the file, shown as "FILE 1", "FILE 2", "FILE 3" in the figure, and addresses such as "0x000000", "0x001000", "0x002500" are assigned to each area storing the file.

FIG. 3 is a conceptual view showing an example of the recording content of the file management table 103b of the IC card 1 of the present invention. In the file management table 103b, each file stored in the file storage area 103a is managed by each record unit, and data is recorded for each item such as a record address specifying the record, attribute information related to the file, file address, and command specifying information, etc. The address such as "P1", "P2", and "P3" is recorded as the record address. The file address shows the address of the file storage area 103a in which the file is recorded, and corresponds to the address such as "0x000000", "0x001000", "0x002500" as shown in FIG. 2. The command specifying information is the information of a file name specifying the command such as a file ID, which is shown as the information of "FILE 1 0x00", "FILE 2 0x00", and "FILE 3 0x00" in FIG. 3. In FIG. 3, a designation mark sequence "0x00" showing an end of the file is added in the end, to indicate the name corresponding to the name of the file as shown in FIG. 2.

FIG. 4 is a conceptual view showing an example of the recording content of the reception buffer 104a of the IC card 1 of the present invention. The reception buffer 104a has a plurality of recording areas to which continuous addresses such as "0xffff01", "0xffff02", "0xffff03", "0xffff04", and "0xffff05" are assigned, and in the plurality of recording areas, an illegal command code is recorded by initialization processing as will be described later in the address which is alternately an even number in the end, the illegal command code being non-executable information that can not be executed by the control circuit 101. Then, when the information is received from the external apparatus 2, the received information is divided and recorded in the recording areas, in which the illegal command code is not recorded, designated by the tail end odd-numbered address, for example. Note that the continuous address here means the address which is continuously referenced based on the program counter incorporated in the control circuit 101, and the numbers are not necessarily continued in this continuous address.

Figure 5:
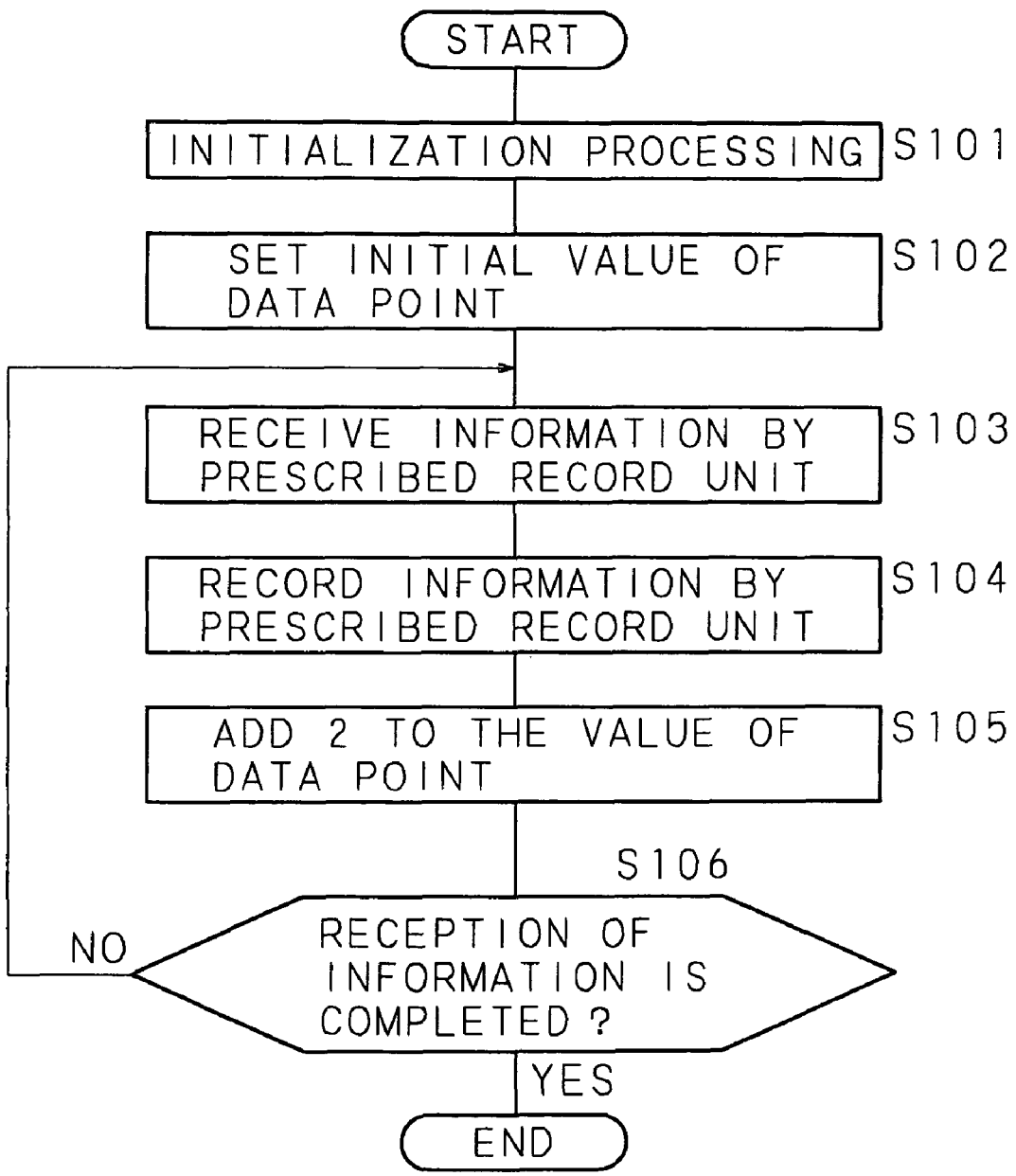
FIG. 5 is a flowchart showing an example of reception information recording processing of the IC card of the present invention.

Next, the processing of the IC card 1 of the present invention will be explained. FIG. 5 is a flowchart showing an example of the reception information recording processing of the IC card 1 of the present invention. When the IC card 1 and the external apparatus 2 are approached or brought into contact with each other to an extent enabling mutual communication, or when they are connected by communication line, the information is transmitted from the external apparatus 2 to the IC card 1. The information transmitted to the IC card 1 from the external apparatus 2 is, for example, the information for executing the command to transmit the information previously recorded in the IC card 1, and the information for reading the information recorded in the IC card 1.

The IC card 1, by the control of the control circuit 101 whereby the system program 110 is executed, sets the recording areas in a recordable state, to which the odd-numbered addresses of the reception buffer 104a are assigned, then performs initialization processing of recording the illegal command code, which is the non-executable information that cannot be executed, in the recording areas designated by even-numbered addresses (S101), and sets the first odd-numbered address of the reception buffer 104a as an initial value in a data pointer showing the address of the recording areas in which the reception information is recorded (S102). Note that the data pointer is stored in the memory which is incorporated in the control circuit 101, for example.

Then, the IC card 1 receives the information corresponding to a prescribed record unit such as 1 byte, as the reception information transmitted from the external apparatus 2, by the communication circuit 102 (S103), and the reception information corresponding to a prescribed record unit thus received is recorded in the recording areas to which the odd-numbered addresses shown by the data pointer are assigned (S104), then "2" is added to the value of the data pointer (S105), and it is determined whether or not reception of reception data is completed (S106). In step S105, by adding "2" to the value of the data pointer, the data pointer shows the odd-numbered address next to the odd-numbered address showing the recording areas in which the reception information is recorded. It is determined whether or not the reception of the reception data in step S106 is completed, by determining, for example, whether or not the recorded reception information corresponding to a data length is received.

In step S106, when the reception of the reception data is determined not to be completed (S106: NO), the processing is returned to step S103, and the reception information corresponding to the next record unit is received, and the processing thereafter is repeated.

In step S106, when the reception of the reception data is determined to be completed (S106: YES), the reception information recording processing is ended.

By the processing as shown in steps S103 to S106, the IC card 1 divides and records the reception information transmitted from the external apparatus 2, in the recording areas shown by the discontinuous addresses of the reception buffer 104*a*, i.e. the odd-numbered addresses here.

FIG. 6 is a conceptual view showing an example of the content of the reception information received by the IC card 1 of the present invention. The reception information transmitted from the external apparatus 2 and received by the IC card 1 is the command APDU defined by the standard such as an ISO/IEC7816-4, etc, and includes a command header of four bytes and a command body. The command header includes the information such as a CLA (Class byte) showing a command class, an INS (Instruction byte) showing a command code, and a P1 (Parameter 1) and P2 (Parameter 2) showing a command parameter. In the command body, an Lc (length of command data) field including a data field length of the command APDU, a data field, and an Le (length of expected data) field including the data field length of a response APDU are provided, and the reception information recorded in the reception buffer 104*a* is included in the data field.

FIG. 7 is a conceptual view showing an example of a state of recording the reception information in the reception buffer 104*a* of the IC card 1 of the present invention. FIG. 7 shows a state of receiving "FILE 2 0x00" as the reception information in the IC card 1 and the state of recording it in the reception buffer 104*a*. As shown in FIG. 7, the IC card 1 divides and records the received reception information in discontinuous areas in which the illegal command codes are not recorded, i.e. in the recording areas designated by the tail end odd-numbered addresses in this case. Thus, by dividing and recording the reception information, the execution of the command for the illegal operation can be prevented. This is because even if the recorded reception information is the command (program code) for the illegal operation, and the attacker attacks to the IC card 1 such as irradiation of particular noise, and the address of the reception buffer 104*a* is set in the program counter by operating the program counter of the control circuit 101, the non-executable information is also read when the reception information is read, and therefore the countermeasure to the abnormality such as reset processing and illegal interrupt processing is performed.

Figure 8:
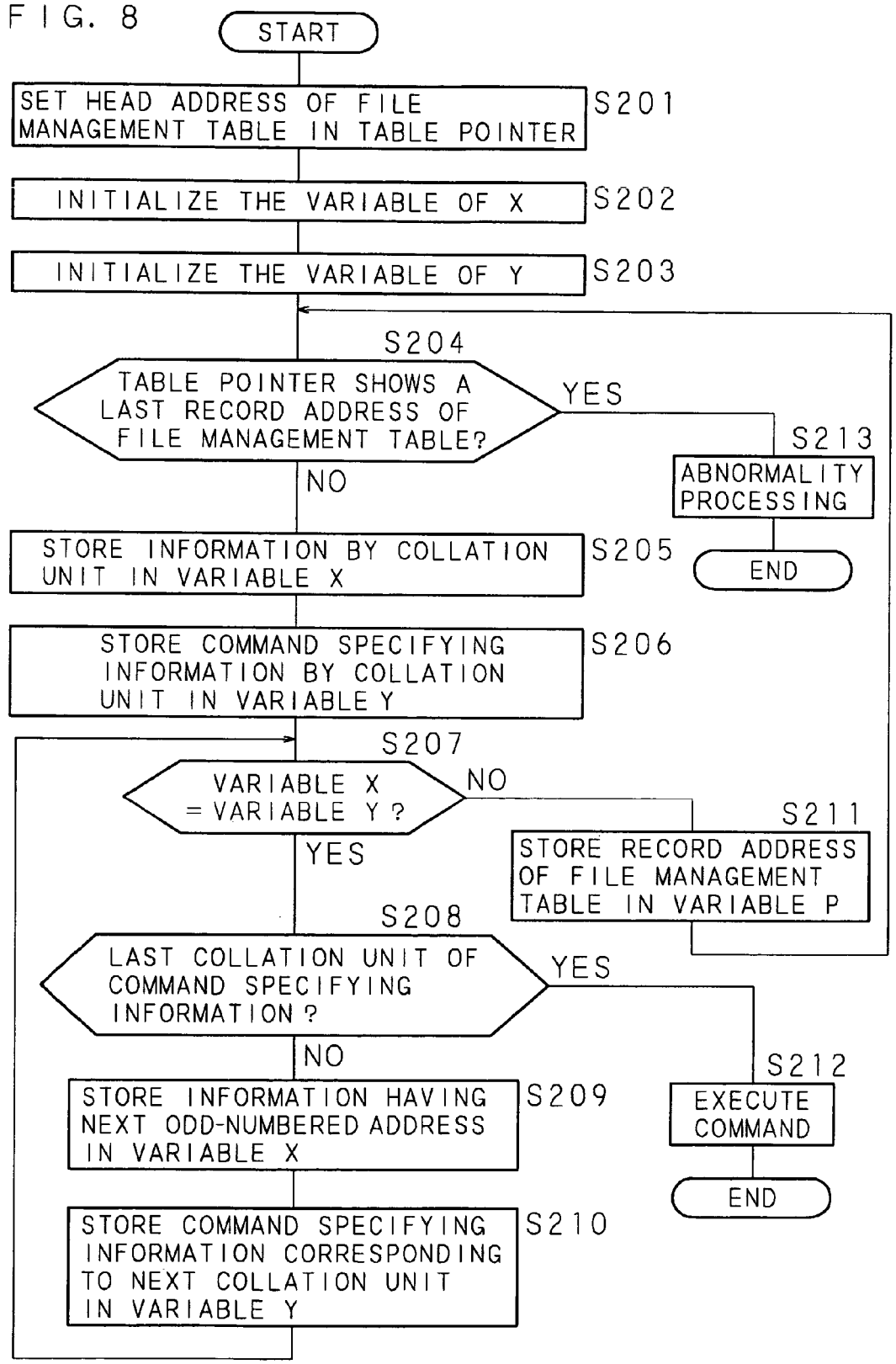
FIG. 8 is a flowchart showing an example of the reception information reading processing of the IC card of the present invention.

FIG. 8 is a flowchart showing an example of the reception information reading processing of the IC card 1 of the present invention, and FIG. 9 is a table showing an example of a change quantity of values of variables used in the reception information reading processing of the IC card 1 of the present invention. Note that in the explanation hereafter, it is so assumed that the IC card 1 receives the "FILE 2 0x00" as shown in FIG. 7 as the reception information and records it in a state as shown in FIG. 7. When the command based on the reception information divided and recorded in the reception buffer 104*a* is executed, a collation unit recorded in the reception buffer 104*a* is used here, such as a variable X for storing the reception information divided in 1 byte, a variable Y for storing the command specifying information corresponding to the collation unit recorded in the file management table 103*b*, and a variable P for storing the table pointer showing the record address of the file management table 103*b*. The variable X, the variable Y, and the variable P are stored in the memory incorporated in the control circuit 101, for example. Note that the collation of the reception information as will be explained hereunder is performed per every unit length in which the reception information is recorded, and therefore the record unit for the reception information recording processing and the collation unit for the reception information reading processing have the same unit length, i.e. 1 byte in this case.

The IC card 1 sets head record address of the file management table 103*b* in the table pointer by the control of the control circuit 101 whereby the system program 110 is executed (S201). The value of each variable in step S201 is in a state as shown as a phase 1 in FIG. 9, and the variable P stores "P1" showing the head record address of the file management table 103*b*.

Then, the IC card 1 initializes the variable X (S202), and further initializes the variable Y (S203). In steps S202 to S203, the value of each variable is in a state shown as a phase 2 of FIG. 9, and the variable X and the variable Y stores, for example, "0x00" as an initial value.

Then, the IC card 1 refers to the variable P and determines whether or not the table pointer shows a last record address of the file management table 103*b* (S204), and when it so determines that the table pointer does not show the last record address (S204: NO), reads the reception information corresponding to the collation unit recorded in the reception buffer 104*a* and stores it in the variable X (S205), reads the command specifying information corresponding to the collation unit stored in the file management table 103*b* and stores it in the variable Y (S206). In this stage, the value of each variable is in a state shown as a phase 3 of FIG. 9. The pointer for showing the address of the recording area from which the reception information is read on the reception buffer 104*a* is initialized so as to indicate the head odd-numbered address of each recording area in which the reception information is recorded for every collation unit (recording unit), at the start of the reception information reading processing. Therefore, as shown in FIG. 9, the variable X stores "F" as the reception information corresponding to the first collation unit. In addition, as shown in FIG. 3, "FILE 10x00" is recorded in the record specified by the variable P1 of the file management table 103*b* as the command specifying information. Therefore, the variable Y stores "F" which is the command specifying information corresponding to the first collation unit.

Then, the IC card 1 collates the reception information corresponding to the collation unit stored in the variable X and the command specifying information corresponding to the collation unit stored in the variable Y (S207). When it is so determined that the aforementioned reception information and the command specifying information are coincident to each other (S207: YES), it is determined whether or not the collated command specifying information corresponding to the collation unit stored in the variable Y is the command specifying information corresponding to the last collation unit (S208).

In step S208, when it is so determined that the aforementioned command specifying information is not the command specifying information corresponding to the last collation unit (S208: NO), the IC card 1 reads the reception information corresponding to the collation unit recorded in the recording area designated by the next odd-numbered address of the reception buffer 104*a* and stores it in the variable X (S209), reads the next command specifying information corresponding to the collation unit stored in the file management table 103b and stores it in the variable Y (S210), and the processing is returned to step S207 to repeat the subsequent processing hereafter.

By repeating the processing of steps S207 to S210, the value of each variable is changed as shown in the phase 3 to phase 7 of FIG. 9. However, in the phase 7, the command specifying information corresponding to one collation unit stored in the variable Y is "1", while the reception information corresponding to the collation unit stored in the variable X is "2". Therefore, in the collation of step S207, the aforementioned reception information and the command specifying information are not coincident to each other.

In step S207, when it is so determined that the reception information corresponding to the collation unit stored in the variable X and the command specifying information corresponding to the collation unit stored in the variable Y are not coincident to each other (S207: NO), the IC card 1 stores the next record address of the file management table 103b in the variable P (S211), and the processing is returned to step S204 to repeat the subsequent processing hereafter. The value of each variable in step S211 is in a state shown as a phase 8 of FIG. 9, and the variable P stores "P2" showing a second record of the file management table 103b.

The processing is returned to step S204, and by repeating the subsequent processing hereafter, the value of each variable is changed as shown in phases 9 to 14 of FIG. 9. However, in the phase 14, the command specifying information corresponding to the collation unit stored in the variable Y is "0x00" showing the command specifying information corresponding to the last collation unit. Therefore, in step S208, it is so determined that this command specifying information is the last command specifying information. Namely, by the processing of steps S201 to S211, the reception information and the command specifying information are collated for each collation unit, and the command specifying information coincident with the reception information divided and recorded in the reception buffer 104a is retrieved by collation.

In step S208, when it is so determined that the command specifying information is the last one of the collation unit (S208: YES), the IC card 1 executes the command specified by the command specifying information corresponding to the record designated by the record address stored in the variable P (S212). Namely, the IC card 1 reads the file address recorded in the file management table 103b so as to correspond to the command specifying information as a retrieval result, reads the command designated by the read file address from the file storage area 103a, and executes the processing of the application program 111 based on the read command by using the control circuit 101.

As described above, according to the present invention, even if not completely restoring the reception information divided and recorded in the reception buffer 104a, the command can be specified and executed.

In step S204, when it is so determined that the table pointer designates the last record address of the file management table 103b (S204: YES), the IC card 1 executes abnormality processing whereby the command based on the reception information can not be specified (S213), and the processing is ended.

In this embodiment, the embodiment using the IC card is shown. However, the present invention is not limited thereto, and can be applied to various recorders for executing the processing based on the communication with outside, such as a writable IC tag, for example.

Also, this embodiment shows the embodiment of executing the command without completely restoring the divided and recorded reception information. However, the present invention is not limited thereto, and can be developed in various modes such as executing the command after restoring the reception information when the executable command is received as the reception information.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embrace by the claims.

What is claimed is:

1. A recording method implemented in an IC card including a first recording medium having a plurality of recording areas designated by continuous address, a controller configured to execute a command based on information recorded in the recording medium, and a communication circuit configured to communicate with an external apparatus, wherein information of countermeasure processing to abnormality is recorded in multiple discontinuous recording areas of the first recording medium for causing the controller to execute countermeasure processing to abnormality, the method comprising:
   dividing information received from the external apparatus;
   recording the divided information in the recording areas of the first recording medium in which the information of countermeasure processing to abnormality is not recorded, and
   recording command specifying information that specifies a command previously recorded in a second recording medium, wherein
   the controller retrieves the command specifying information coincident with information divided and recorded in the recording areas and executes a command specified by the retrieved command specifying information.

2. A recorder comprising:
   a first recording unit having a plurality of recording areas designated by continuous addresses;
   a controller configured to execute a command based on information recorded in the recording unit;
   a communication unit configured to communicate with an external apparatus;
   a unit configured to record information of countermeasure processing to abnormality in multiple discontinuous recording areas of the first recording unit for causing the controller to execute countermeasure processing to abnormality, and
   a second recording unit configured to record command specifying information specifying a command previously recorded,
   wherein the controller is configured to divide information received from the external apparatus and to record the divided information in the recording areas of the first recording unit in which the information of countermeasure processing to abnormality is not recorded, and
   wherein the controller is further configured to retrieve the command specifying information coincident with information divided and recorded in the recording areas and to execute a command specified by the retrieved command specifying information.

3. An IC card comprising:
   a first recording unit having a plurality of recording areas designated by continuous addresses;
   a controller configured to execute a command based on information recorded in the recording unit;

a communication unit configured to communicate with an external apparatus;

a unit configured to record information of countermeasure processing to abnormality in multiple discontinuous recording areas of the first recording unit for causing the controller to execute countermeasure processing to abnormality, and a second recording unit configured to record command specifying information specifying a command previously recorded, wherein the controller is configured to divide information received by the communication unit and to record the divided information in the recording areas of the first recording unit in which the information of countermeasure processing to abnormality is not recorded wherein the controller is configured to retrieve command specifying information coincident with information divided and recorded in the recording areas and to execute a command specified by the retrieved command specifying information.

4. The IC card according to claim 3, wherein the countermeasure processing to abnormality is a reset processing or an illegal interrupt processing.

5. The IC card according to claim 3, wherein the controller is configured to carry out retrieval by collating the received information and the command specifying information for each prescribed collating unit.

6. An IC card comprising:

first recording means comprising a plurality of recording areas designated by continuous addresses;

a controller for executing a command based on information recorded in the recording means;

communication means for communicating with an external apparatus; and means for recording information of countermeasure processing to abnormality in multiple discontinuous recording areas of the first recording means for executing countermeasure processing to abnormality when the controller reads the information of countermeasure processing to abnormality, second recording means for recording command specifying information specifying a command previously recorded, wherein the IC card is configured to divide information received by the communication means and record the divided information in the recording areas of the first recording means, in which the information of countermeasure processing to abnormality is not recorded wherein the IC card is configured to retrieve command specifying information coincident with information divided and recorded in the recording areas and to execute a command specified by the retrieved command specifying information.

7. The IC card according to claim 6, wherein the countermeasure processing is a reset processing or an illegal interrupt processing.

8. The IC card according to claim 6, further comprising:

means for recording command specifying information specifying a command previously recorded;

means for retrieving command specifying information coincident with the information divided and recorded in the recording areas; and means for executing a command specified by the retrieved command specifying information.

9. The IC card according to claim 8, wherein the means for retrieving is configured so that retrieval is carried out by collating the received information and the command specifying information for each prescribed collating unit.

* * * * *